United States Patent
Kean et al.

(10) Patent No.: US 10,469,988 B2
(45) Date of Patent: Nov. 5, 2019

(54) ULTRA-WIDEBAND RADIO FREQUENCY TRACKING OF AN IMPLEMENT ON A WORK VEHICLE

(71) Applicant: Deere & Company, Moline, IL (US)

(72) Inventors: Michael G. Kean, Dubuque, IA (US); Mark J. Cherney, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/410,309

(22) Filed: Jan. 19, 2017

(65) Prior Publication Data

US 2018/0206072 A1    Jul. 19, 2018

(51) Int. Cl.
*H04W 4/02* (2018.01)
*H04W 4/029* (2018.01)
*H04W 4/44* (2018.01)

(52) U.S. Cl.
CPC .......... *H04W 4/023* (2013.01); *H04W 4/026* (2013.01); *H04W 4/029* (2018.02); *H04W 4/44* (2018.02); *H04M 2250/10* (2013.01)

(58) Field of Classification Search
None
See application file for complete search history.

(56) References Cited

U.S. PATENT DOCUMENTS

| | | |
|---|---|---|
| 2015/0106004 A1 | 4/2015 | Taylor et al. |
| 2015/0161872 A1 | 6/2015 | Beaulieu et al. |
| 2015/0225923 A1 | 8/2015 | Wallace et al. |
| 2016/0208460 A1 | 7/2016 | Kirsch |

FOREIGN PATENT DOCUMENTS

DE    102010060137    6/2011

OTHER PUBLICATIONS

DE102017203576.5 Search Report from the German Intellectual Property Office dated Nov. 6, 2017 (13 pages, which includes a Statement of Relevance).
Jung et al., "Ultra-Wideband Radar Development for Non-Touch Terrain Sensing Application on Close Combat Support Vehicles," specification (2000) Army Tank-Automotive Command, 22 pages.
Teizer et al., "Rapid automated monitoring of construction site activities using ultra-wideband," Proceedings of the 24th International Symposium on Automation and Robotics in Construction, Kochi, Kerala, India (2007) pp. 23-28.

*Primary Examiner* — Roy Y Yi
*Assistant Examiner* — Geoffrey T Evans
(74) *Attorney, Agent, or Firm* — Michael Best & Friedrich LLP

(57) ABSTRACT

A method and system of position determination of an implement on a work vehicle. The method includes determining a position of a first radio frequency (RF) device relative to a local reference frame using ultra-wideband ranging between the first RF device and at least one additional RF device. The first RF device is coupled to a fixed location on the implement, and the additional RF device is mounted at a fixed location relative to the local reference frame. The implement is controllably movable relative to the local reference frame. A position and orientated of the implement is determined relative to the local reference frame based at least in part on the determined position of the first RF device relative to the local reference frame.

11 Claims, 6 Drawing Sheets

ULTRA-WIDEBAND RADIO FREQUENCY TRACKING OF AN IMPLEMENT ON A WORK VEHICLE

BACKGROUND

Some work vehicles may be equipped with position sensors that detect a change in position of an implement of the work vehicle along a given direction. For example, a work vehicle may be equipped with rotation sensors or cylinder position sensors that detect positional changes of implements on the work vehicle (for example, a blade on a road grader or a boom on an excavator). However, position sensors may have limited precision in sensing position due to hysteresis in gearing or linkage that control the movement of the implement.

Another method of position determination of an implement on a work vehicle is attaching a global positioning system (GPS) receiver to the implement. For example, a road grader may include one or more masts extending from the blade that have a GPS receiver installed thereon. The GPS receiver provides the work vehicle with an approximate location of the mast. However, using GPS technology provides only rough approximation of the position of the implement and the size and position of the masts can restrict movement, usage, and design of the implement.

SUMMARY

Some embodiments described herein provide systems and methods for position determination of an implement on a work vehicle with respect to a local reference frame using ultra-wideband ranging. The system may incorporate GPS to define the local reference frame with respect to a global reference frame. The system provides a mastless solution that provides high accuracy position detection. In particular, the system may track the position of the implement with accuracy approaching 2 mm. By establishing the local reference frame with high accuracy position detection, the system provides increased precision of position control of the implement on the work vehicle.

One embodiment provides a method of position determination of an implement on a work vehicle. The method includes determining a position of a first radio frequency (RF) device relative to a local reference frame using ultra-wideband ranging between the first RF device and at least one additional RF device. The additional RF device is mounted at a fixed location relative to the local reference frame, and the first RF device is coupled to a fixed location on the implement. The implement is controllably movable relative to the local reference frame. The method includes determining a position and an orientation of the implement relative to the local reference frame based at least in part on the determined position of the first RF device relative to the local reference frame.

Another embodiment provides a system for determining a position of an implement on a work vehicle. The system includes a first radio frequency (RF) device coupled to a fixed location on the implement and at least one additional RF device mounted at a fixed location relative to a local reference frame. The system also includes an electronic processor communicatively coupled to the first RF device and the at least one additional RF device. The electronic processor is configured to determine a position of the first RF device relative to the local reference frame using ultra-wideband ranging between the first RF device and the at least one additional RF device. The electronic control unit determines a position and an orientation of the implement relative to the local reference frame based at least in part on the determined position of the first RF device relative to the local reference frame.

Other aspects of the disclosure will become apparent by consideration of the detailed description and accompanying drawings.

DETAILED DESCRIPTION

Before any embodiments are explained in detail, it is to be understood that embodiments disclosed herein are not limited to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, various aspects may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
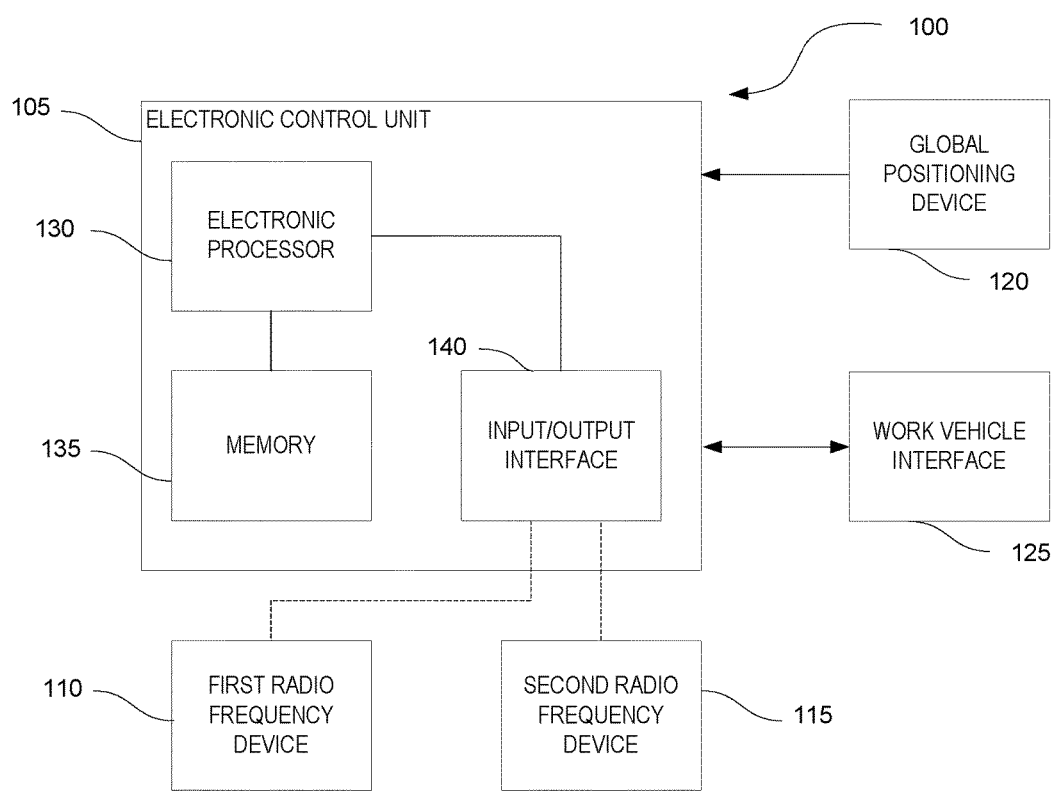
FIG. 1 is a block diagram of an ultra-wideband position tracking system according to one embodiment.

FIG. 1 illustrates an ultra-wideband position tracking system 100 according to one embodiment. In the example illustrated, the ultra-wideband position tracking system 100 includes an electronic control unit 105, a first radio frequency (RF) device 110, a second radio frequency (RF) device 115, a global positioning device 120 (for example, a GPS receiver), and a work vehicle interface 125. In some embodiments, the ultra-wideband position tracking system 100 is located on or inside a work vehicle, as described below. In other embodiments, the ultra-wideband position tracking system 100 is partially located on or inside the work vehicle and partially located external to the work vehicle (for example, located within a work site). Similarly, the electronic control unit 105 of the ultra-wideband position tracking system 100 may be located in or inside the work vehicle or may be located externally from the work vehicle (for example, at the work site).

In some embodiments, the electronic control unit 105 is communicatively coupled to both the first RF device 110 and the second RF device 115. For example, in one embodiment, the electronic control unit 105 is communicatively connected to both the first RF device 110 and the second RF device 115 via a short-range RF connection (for example, local area network, Bluetooth, and the like). In other embodiments, the first RF device 110 and the second RF device 115 are communicatively connected via a wired connection. In some embodiments, the electronic control unit 105 may function as the second RF device 115 by originating the ultra-wideband RF signals with a single RF transmitter with multiple antennas (positioned at multiple locations) or multiple RF transmitters or transceivers positioned at multiple different locations.

In addition, in some embodiments, the first RF device 110 is not communicatively coupled to the electronic control unit 105, but rather is only communicatively coupled with the second RF device 115. In particular, the second RF device 115 may provide data communications with the electronic control unit 105, thus functioning as a master unit with the first RF device functioning as a slave unit. In this case, the first RF device 110 may be a secondary or passive device that responds to signals received from the second RF device 115. In particular, the first RF device 110 may include multiple receivers, repeaters, reflectors, and the like that are configured to generate a signal only in response to signals received from the second RF device 115. In some embodiments, ultra-wideband RF signals generated by the second RF device 115 are transmitted to the first RF device 110 and trigger the first RF device 110 to generate an ultra-wideband RF signal for reception at the second RF device 115. In this way, the first RF device 110 and the second RF device 115 communicate with each other via ultra-wideband RF signals while the electronic control unit 105 may communicate via other wireless or wired signals. In particular, the ultra-wideband RF signals may occupy a bandwidth of greater than 20% of an arithmetic center frequency or more than 500 MHz. In some embodiments, the power amplitude of the ultra-wideband ranging is configured to provide a tracking range that is less than a length of the work vehicle and the ultra-wideband ranging is configured such that a decrease in the tracking range results in a corresponding increase in a tracking accuracy.

The electronic control unit 105 is also communicatively connected to the global positioning device 120 and the work vehicle interface 125. In some embodiments, the global positioning device 120 provides a location of the work vehicle with respect to a global reference frame. In other embodiments, the global positioning device 120 provides a location of a work site with respect to the global reference frame. A site plan may include references to locations within the global reference frame to provide information regarding desired terrain or desired modifications to be performed by the work vehicle at particular locations within the work site. In particular, the site plan may outline work to be performed at multiple locations based on the global coordinates of those multiple locations. The work vehicle interface 125 may be configured to perform input/output functions for an operator of the work vehicle. For example, the work vehicle interface 125 may include a touchscreen display that provides indications to the operator of the status of the ultra-wideband position tracking system 100. In particular, the work vehicle interface 125 may provide indications including audial, visual, haptic, or a combination of the foregoing regarding positioning of the work vehicle and positioning of implements on the work vehicle.

The electronic control unit 105 includes a plurality of electrical and electronic components that provide power, operation control, and protection to the components and modules within the electronic control unit 105. The electronic control unit 105 includes, among other things, an electronic processor 130 (such as a programmable electronic microprocessor, microcontroller, or similar device), a memory 135 (e.g., non-transitory, machine readable memory), and an input/output interface 140. The electronic processor 130 is communicatively coupled to the memory 135 and executes instructions which are capable of being stored on the memory 135. The electronic processor 130 is configured to retrieve from memory 135 and execute, among other things, instructions related to processes and methods described herein. In other embodiments, the electronic control unit 105 includes additional, fewer, or different components. For example, the electronic control unit 105 may be implemented in several independent electronic control units each configured to perform specific functions or sub-functions. Additionally, the electronic control unit 105 may contain sub-modules that generate or transmit control signals to the first RF device 110 and to the second RF device 115. For example, the electronic control unit 105 may send a control signal to the second RF device 115 to initiate transmission of the ultra-wideband RF signals as discussed herein. In other embodiments, the electronic control unit 105 may generate and transmit ultra-wideband RF signals via one or more antennas that serve as the second RF device 115.

Figure 2:
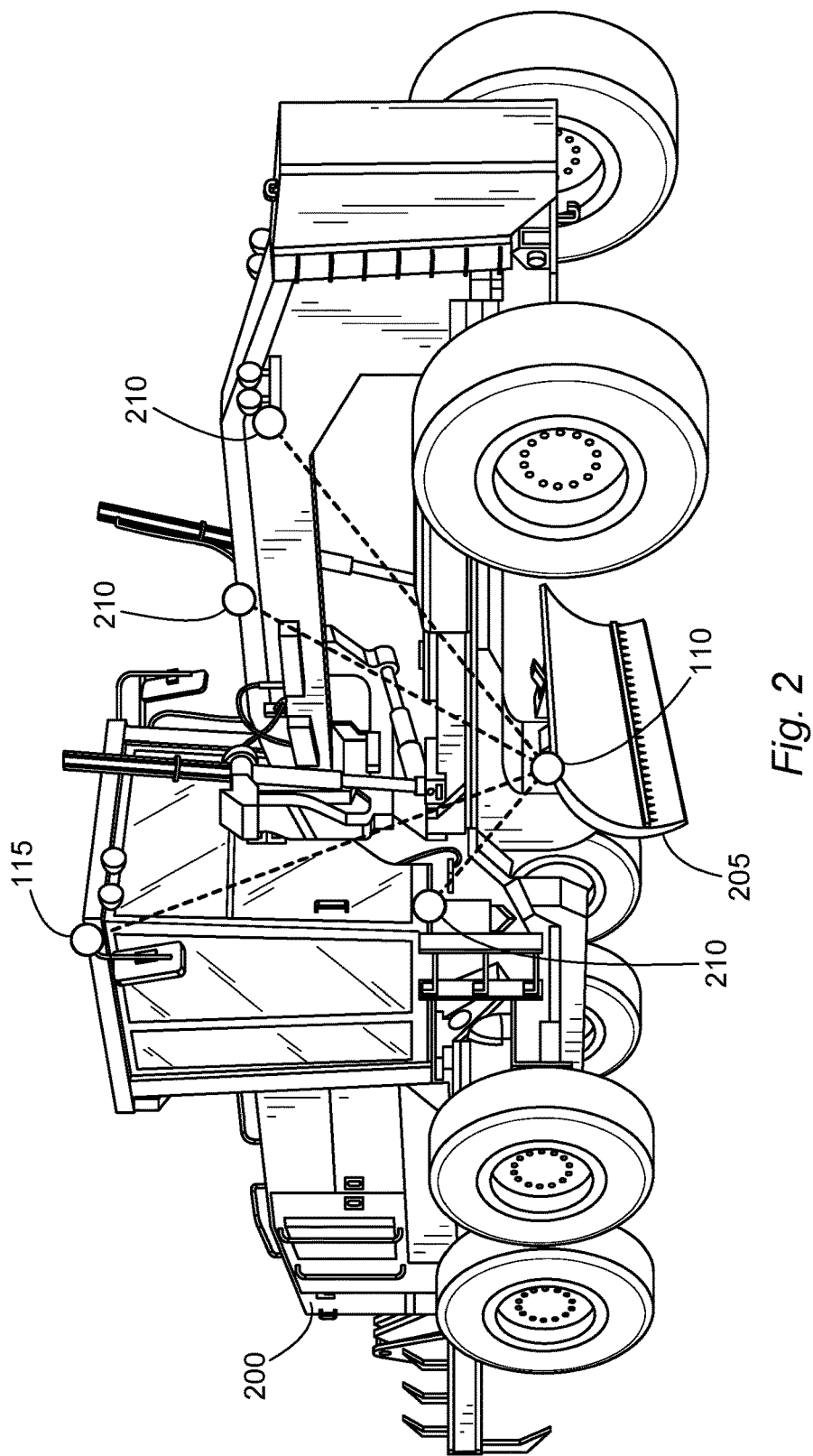
FIG. 2 is a perspective view of a work vehicle equipped with the ultra-wideband position tracking system of FIG. 1 according to one embodiment.

FIG. 2 illustrates a perspective view of a work vehicle 200 equipped with the ultra-wideband position tracking system 100. In the example illustrated, the work vehicle 200 includes an implement 205. The implement 205 includes a controllably-movable attachment, blade, arm, shovel, and the like that is controlled to perform a work task. For example, the work vehicle 200 may be a road grader with a blade implement that is controlled to shape a ground surface. In this example, the implement 205 is moved relative to the work vehicle 200 to a desired height, angle, inclination, and the like. In the example illustrated, the work vehicle 200 is equipped with the first RF device 110 and the second RF device 115. The first RF device 110 is positioned to move along with the implement 205. In some embodiments, the first RF device 110 is fixed to the implement by mounting directly to the implement 205. The second RF device 115 may be fixed to the work vehicle by mounting to a fixed position on the work vehicle 200. In addition to the second RF device 115, multiple additional transceivers 210 may also be positioned at multiple locations on the work vehicle 200 and are operated similar to the second RF device 115 to determine the position of the first RF device 110 relative to the work vehicle 200. As shown in the example of FIG. 2, the multiple additional transceivers 210 are mounted at locations around the first RF device 110 and on opposite sides of the first RF device 110 to improve the ability of the ultra-wideband position tracking system 100 to precisely determine the location of the first RF device 110 (e.g., through triangulation).

Figure 3:
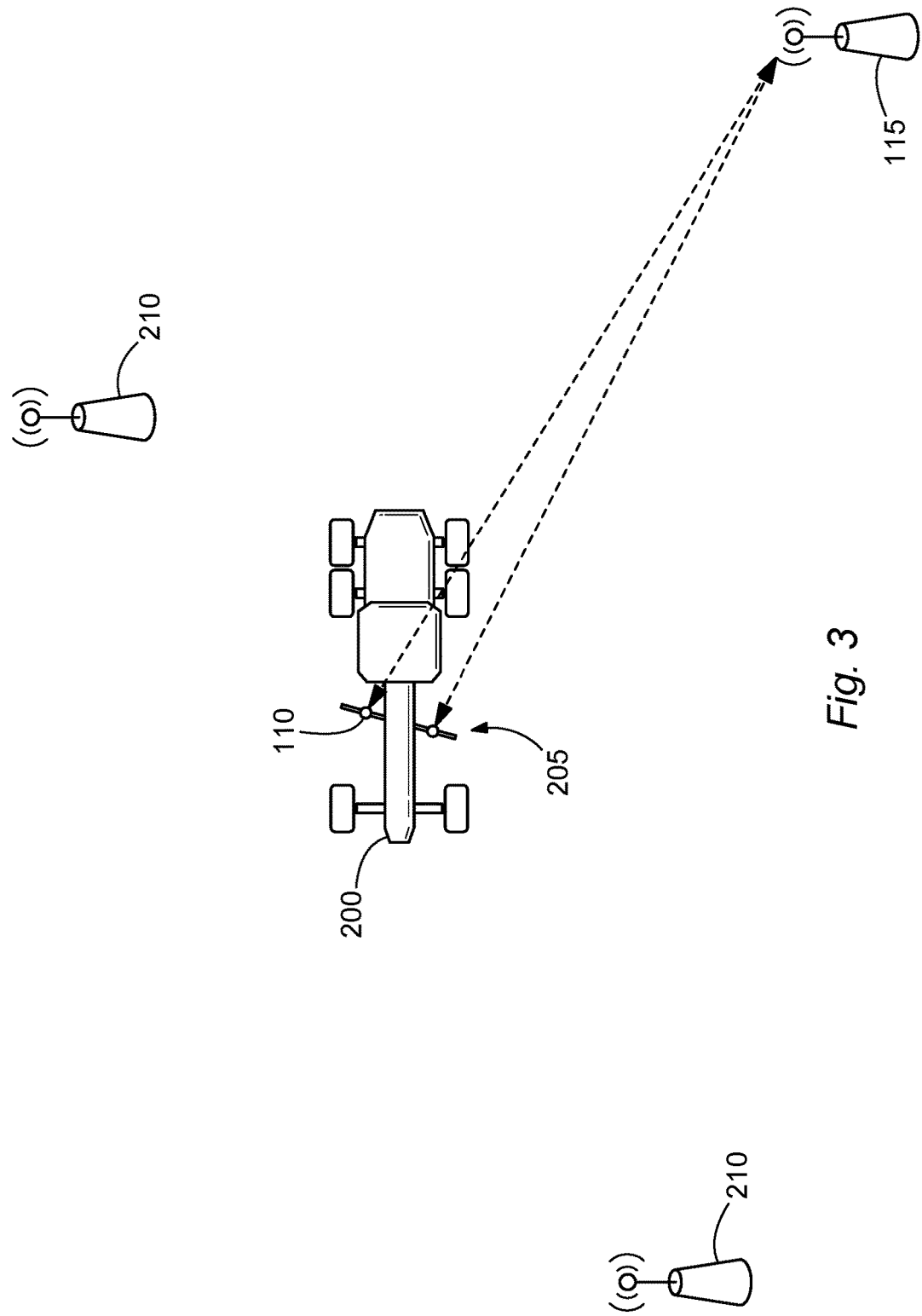
FIG. 3 is an overhead view of a local area including the ultra-wideband position tracking system of FIG. 1 according to one embodiment.

FIG. 3 illustrates an alternative implementation of the ultra-wideband position tracking system 100 where the second RF device 115 and the additional transceivers 210 are positioned at various different locations within a local area (e.g., a job site) and are not mounted or affixed to the work vehicle 200 itself. The second RF device 115 and the multiple additional transceivers 210 are mounted at stationary locations relative to the work site. In the example of FIG. 3, the multiple devices are positioned at locations on multiple sides of the locations where the work vehicle 200 will be operating (i.e., the work site). In this case, the multiple devices transmit signals to the first RF device 110 located on the implement 205 of the work vehicle 200. The first RF device 110 transmits signals back to the second RF device 115 as the signals are received. This allows the electronic control unit 105 to determine the location of the implement 205 relative to the second RF device 115, thus determining the location of the implement relative to the local area. In some embodiments, the multiple devices may each include a GPS module to define a local area coordinate system with respect to a global coordinate system such as GPS coordinates.

In the example of FIG. 2, a local reference frame is defined with respect to the work vehicle 200 and the position of the implement 205 (as defined by the position of the first RF device 110) is determined relative to the work vehicle 200 (in the local reference frame defined by the placement of the second RF device 115 and any additional transceivers 210). In the example of FIG. 3, the local reference frame is defined with respect to the job site and the position of the implement 205 (as defined by the position of the first RF device 110) is determined relative to the job site (in the local reference frame defined by the placement of the second RF device 115 and any additional transceivers 210). In some implementations of the system illustrated in FIG. 3, the position of the implement 205 is determined relative to the job site without reference to the position of the work vehicle 200 itself. In either case (and as described in further detail below), the position of the implement 205 is determined relative to the local reference frame without using GPS and, after determining a position of the local reference frame relative to a global reference frame (for example, using GPS), the position of the implement 205 in the global reference frame can be determined and tracked.

The first RF device 110 and the second RF device 115 may implement various techniques for establishing the relative location of the first RF device 110 with respect to the second RF device 115. The second RF device 115, whether positioned on the work vehicle 200 or within the local area, generates multiple signals on multiple sides of the first RF device 110 to establish a positional determination of the first RF device 110. For example, the ultra-wideband position tracking system 100 may incorporate time of flight (i.e. time of arrival) calculations to determine a distance between the first RF device 110 and the second RF device 115. Multiple time of flight determinations between multiple RF devices acting as the second RF device 115 and multiple RF devices acting as the first RF device 110 may establish a 3-dimensional location determination within the local area and a determination of the orientation of the implement 205. In this first example, the electronic control unit 105, the first RF device 110, and the second RF device 115 are time synchronized to allow for calculation of times of flight. In another example, the ultra-wideband position tracking system 100 may incorporate time difference of arrival calculations. In this second example, the transmitters are time synchronized, but not necessarily the first RF device 110 and the electronic control unit 105. In yet another example, the ultra-wideband position tracking system 100 may use angle of arrival calculations. In this third example, the second RF device 115 includes an antenna array that is configured to sense a reception angle of the transmitted ultra-wideband RF signals. In yet another example, the ultra-wideband position tracking system 100 may use received signal strength calculations to determine distance between the first RF device 110 and the second RF device 115. In some embodiments, the ultra-wideband position tracking system 100 is configured to use a combination of the foregoing techniques to perform ultra-wideband ranging.

Although the examples of FIGS. 2 and 3 show only a single RF device 110 mounted on the implement 205, in some embodiments, the first RF device 110 includes multiple devices positioned at various locations on the implement 205. Each of these devices may act independently in response to signals received from the second RF device 115. The electronic control unit 105 may determine, based on the independent responses, the location of each of the multiple devices using the techniques described above. For example, each of the multiple devices may be positioned at predetermined positions on the implement 205, thus establishing a positional relationship between the multiple devices. Since the relative position of the multiple devices on the implement 205 is known, the electronic control unit 105 may determine the precise orientation of the implement 205. For example, the electronic control unit 105 may determine the height, angle, depth, and the like of the implement 205.

Figure 4:
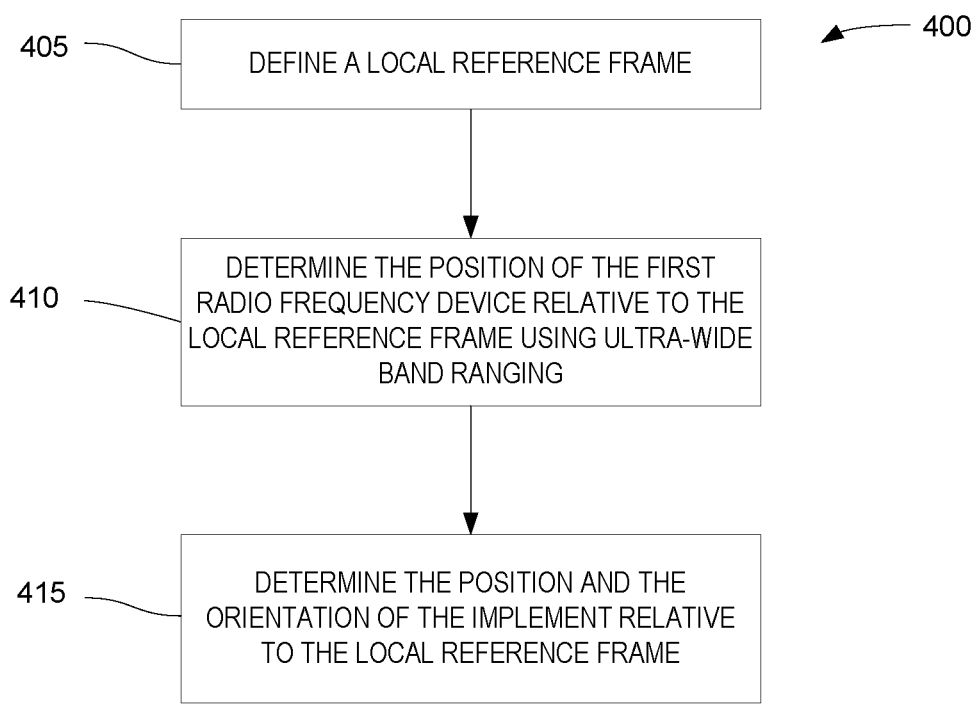
FIG. 4 is a flowchart of a method of determining a position of an implement on a work vehicle using the ultra-wideband position tracking system of FIG. 1 according to one embodiment.

FIG. 4 illustrates a method 400 of determining a position of the implement 205 on the work vehicle 200 using the ultra-wideband position tracking system 100 according to one embodiment. Prior to performance of the method 400, the first RF device 110 is positioned on the implement 205 and the second RF device 115 is positioned at a fixed location relative to the local reference frame. In the method 400, the local reference frame is defined by the electronic control unit 105 (block 405). The local reference frame provides a mechanism to define a position of the first RF device 110 locally (i.e., without GPS) as a coordinate system fixed with respect to the second RF device 115. For example, the local reference frame may have an origin at the second RF device 115, at the electronic control unit 105, at a fixed location on the work vehicle 200, or at a fixed location in the local area. The position of the first RF device 110 is determined relative to the local reference frame using ultra-wideband RF ranging (block 410). As discussed above, the position may be determined using various ultra-wideband ranging techniques including time-of-arrival, angle of arrival, time difference of arrival, received signal strength, or some combination of the foregoing. The position of the implement 205 is then determined relative to the local reference frame based on the determined position of the first RF device 110 (block 415). In embodiments that include multiple RF devices as the first RF device 110, the orientation of the implement 205 is also determined.

Figure 5:
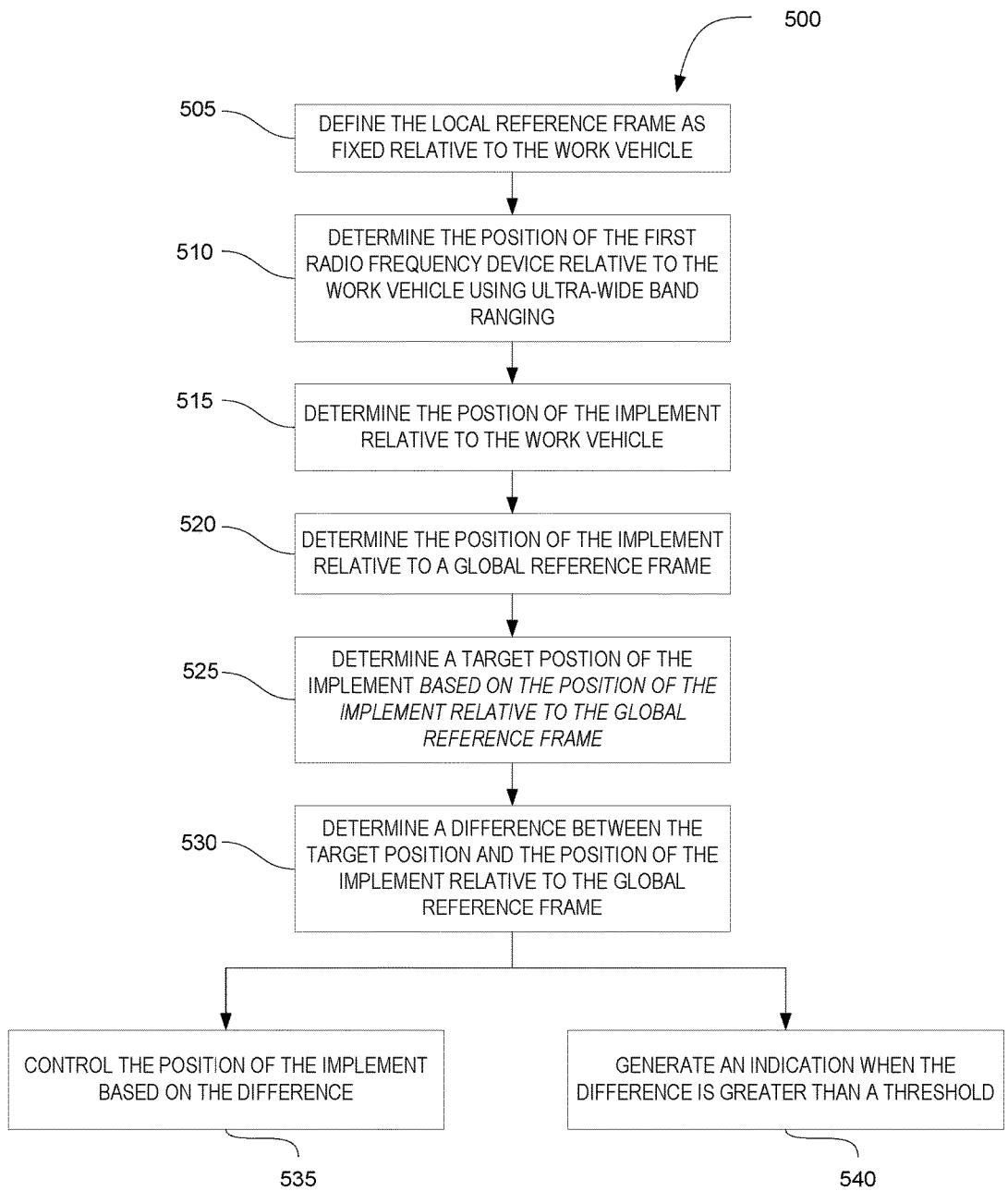
FIG. 5 is a flowchart of a method of determining a position of an implement on the work vehicle of FIG. 2 according to one embodiment.

FIG. 5 illustrates a method of determining the position of the implement 205 when the second RF device 115 is positioned on the work vehicle 200 as shown in the example of FIG. 2. Prior to performance of the method 500, the first RF device 110 is positioned on the implement 205, and the second RF device 115 is positioned at a fixed location on the work vehicle 200. In the method 500, the local reference frame is defined (block 505). The position of the first RF device 110 relative to the work vehicle 200 is determined by the electronic control unit 105 using ultra-wideband RF ranging (block 510). The position of the implement 205 relative to the work vehicle 200 is determined based on the position of the first RF device 110 (block 515). The position of the implement 205 relative to a global reference frame is determined (block 520). This determination may be performed based on the position of the implement 205 relative to the work vehicle 200 and the position of the work vehicle 200 relative to the global reference frame. In particular, the position of the work vehicle 200 relative to the global reference frame may be determined based on signals received from the global positioning device 120.

In some embodiments, the target position of the implement 205 is also determined (block 525). The target position may be determined at least in part based on the determined position of the implement relative to the global reference frame and the site plan as discussed above. A difference (i.e., a positioning error) between the target position and the position of the implement 205 relative to the global reference frame is then determined (block 530). The electronic control unit 105 is then able to perform several functions based on the difference. For example, in one embodiment, the electronic control unit 105 automatically controls the position of the implement 205 using control systems in the work vehicle 200 (block 535). In another example, the electronic control unit 105 may generate an indication when the difference is greater than a threshold (block 540). In particular, the electronic control unit 105 may transmit a signal to the work vehicle interface 125 that generates a notification for the operator of the work vehicle 200. The notification may alert the operator that the implement 205 is out of a predetermined range, which may be adjusted by setting different values for the threshold. The operator may then manually reposition the implement 205.

Figure 6:
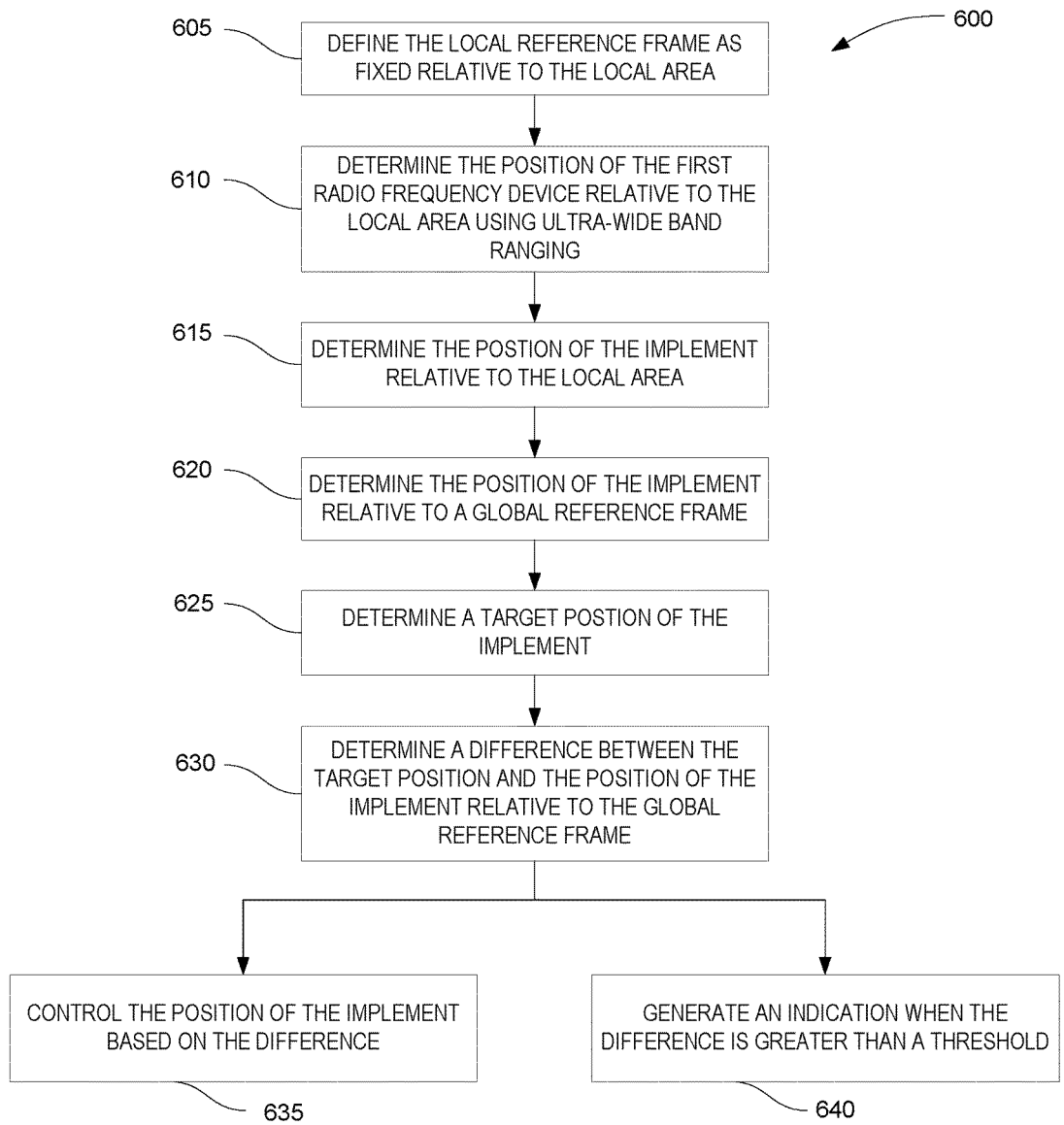
FIG. 6 is a flowchart of a method of determining a position of an implement within the local area of FIG. 3 according to one embodiment.

FIG. 6 illustrates a method of determining the position of the implement 205 when the second RF device 115 is positioned within the local area, but is not mounted on the work vehicle 200 itself, as shown in the example of FIG. 3. Prior to performance of the method 600, the first RF device 110 is positioned on the implement 205, and the second RF device 115 is positioned at a fixed location relative to the local area. In the method 600, the local reference frame is defined (block 605). The position of the first RF device 110 relative to the local area is determined by the electronic control unit 105 using ultra-wideband RF ranging (block 610). The position of the implement 205 relative to the local area is determined based on the position of the first RF device 110 (block 615). The position of the implement 205 relative to a global reference frame is then determined (block 620). This determination may be performed based on the position of the implement 205 relative to the local area and the position of the local area relative to the global reference frame. In particular, the position of the local area relative to the global reference frame may be determined based on signals received from the global positioning device 120.

In some embodiments, the target position of the implement 205 is also determined (block 625). Similar to the method 500, the target position may be determined at least in part based on the determined position of the implement relative to the global reference frame and the site plan. A difference (i.e., a positioning error) between the target position and the position of the implement 205 relative to the global reference frame is then determined (block 630). The electronic control unit 105 is then able to perform several functions based on the difference. For example, in one embodiment, the electronic control unit 105 automatically controls the position of the implement 205 using control systems in the work vehicle 200 (block 635). This may include transmitting control information to another electronic control unit within the work vehicle 200 that is configured to perform automatic control of the implement 205. In another embodiment, the electronic control unit 105 may generate an indication when the difference is greater than a threshold (block 540). In particular, the electronic control unit 105 may transmit a signal to the work vehicle interface 125 that generates a notification for the operator of the work vehicle 200. The notification may alert the operator that the implement 205 is out of a predetermined range, which may be adjusted by setting different values for the threshold. As above, the operator may then manually reposition the implement 205.

Thus, embodiments provide, among other things, a system and a method for determining a position of an implement on a work vehicle using ultra-wideband ranging. Various features and advantages of the invention are set forth in the following claims.

What is claimed is:

1. A method of position determination of an implement on a work vehicle, the method comprising:
   determining a position of a first radio frequency (RF) device relative to a local reference frame using ultra-wideband ranging between the first RF device and at least one additional RF device mounted at a fixed location relative to the local reference frame, the first RF device being coupled to a fixed location on the implement and the implement being controllably movable relative to the local reference frame; and
   determining a position and an orientation of the implement relative to the local reference frame based at least in part on the determined position of the first RF device relative to the local reference frame,
   wherein the local reference frame is fixed relative to a work site in which the work vehicle is operating, and wherein determining the position and the orientation of the implement relative to the local reference frame includes determining the position and the orientation of the implement relative to the work site,
   wherein determining the position of the first RF device relative to the local reference frame includes determining the position of the first RF device relative to the work site using the ultra-wideband ranging between the first RF device and the at least one additional RF device, wherein the at least one additional RF device is mounted external to the work vehicle and stationary relative to the work site, and
   wherein a power amplitude of the ultra-wideband ranging is configured to provide a tracking range that is less than a length of the work site, and wherein the ultra-wideband ranging is configured such that a decrease in the tracking range results in a corresponding increase in a tracking accuracy.

2. The method of claim 1, the method further comprising:
   determining a position of the at least one additional RF device relative to a global coordinate system; and
   determining a position of the implement relative to the global coordinate system based on the position of the implement relative to the local reference frame and the position of the at least one additional RF device relative to the global coordinate system.

3. The method of claim 2, the method further comprising:
   determining a desired position of the implement relative to the global coordinate system;
   determining a positioning error based on the desired position of the implement relative to the global coordinate system and the determined position of the implement relative to the global coordinate system.

4. The method of claim 3, the method further comprising providing an indication of the positioning error to an operator of the work vehicle.

5. The method of claim 3, the method further comprising adjusting the position and the orientation of the implement based on the positioning error.

6. The method of claim 1, the method further comprising:
determining a position of a second RF device relative to the local reference frame using ultra-wideband ranging between the second RF device and the at least one additional RF device, the second RF device being coupled to another fixed location on the implement,
wherein determining the position and the orientation of the implement relative to the local reference frame is based at least in part on the determined position of the first RF device relative to the local reference frame and the determined position of the second RF device relative to the local reference frame.

7. The method of claim 1, wherein the at least one additional RF device includes a first additional RF device, a second additional RF device, and a third additional RF device; and wherein determining the position of the first radio frequency (RF) device relative to the local reference frame using ultra-wideband ranging includes
determining a first distance between the first RF device and the first additional RF device,
determining a second distance between the first RF device and the second additional RF device, and
determining a third distance between the first RF device and the third additional RF device,
wherein the first additional RF device, the second additional RF device, and the third additional RF device are positioned on multiple sides of the first RF device.

8. A system for determining a position of an implement on a work vehicle, the system comprising:
a first radio frequency (RF) device coupled to a fixed location on the implement;
at least one additional RF device mounted at a fixed location relative to a work site in which the work vehicle is operating;
an electronic processor communicatively coupled to the first RF device and the at least one additional RF device, the electronic processor configured to
determine a position of the first RF device relative to the work site using ultra-wideband ranging between the first RF device and the at least one additional RF device, and
determine a position and an orientation of the implement relative to the work site based at least in part on the determined position of the first RF device relative to the work site,
wherein a power amplitude of the ultra-wideband ranging is configured to provide a tracking range that is less than a length of the work site, and wherein the ultra-wideband ranging is configured such that a decrease in the tracking range results in a corresponding increase in a tracking accuracy.

9. The system of claim 8, the system further comprising:
a second RF device coupled to another fixed location on the implement; and
a third RF device coupled to yet another fixed location on the implement,
wherein the electronic processor is configured to
determine a position of the second RF device relative to a local reference frame of the work site using ultra-wideband ranging between the second RF device and the at least one additional RF device,
determine a position of the third RF device relative to the local reference frame of the work site using ultra-wideband ranging between the second RF device and the at least one additional RF device,
determine the position and the orientation of the implement relative to the work site based at least in part on the determined position of the first RF device relative to the local reference frame of the work site, the determined position of the second RF device relative to the local reference frame of the work site, and the determined position of the third RF device relative to the local reference frame of the work site.

10. The system of claim 8, the system further comprising:
a second additional RF device positioned on a different side of the first RF device than the at least one additional RF device; and
a third additional RF device positioned on yet another different side of the first RF device than the at least one additional RF device and the second additional RF device,
wherein the electronic processor is configured to
determine a first distance between the first RF device and the at least one additional RF device,
determine a second distance between the first RF device and the second additional RF device, and
determine a third distance between the first RF device and the third additional RF device.

11. A method of position determination of an implement on a work vehicle, the method comprising:
determining a position of a first radio frequency (RF) device relative to a work site using ultra-wideband ranging between the first RF device and at least one additional RF device mounted at a fixed location relative to the work site, the first RF device being coupled to a fixed location on the implement and the implement being controllably movable relative to the work site; and
determining a position and an orientation of the implement relative to the work site based at least in part on the determined position of the first RF device relative to the work site,
wherein a power amplitude of the ultra-wideband ranging is configured to provide a tracking range that is less than a length of the work site, and wherein the ultra-wideband ranging is configured such that a decrease in the tracking range results in a corresponding increase in a tracking accuracy.

* * * * *